United States Patent Office 3,434,427
Patented Mar. 25, 1969

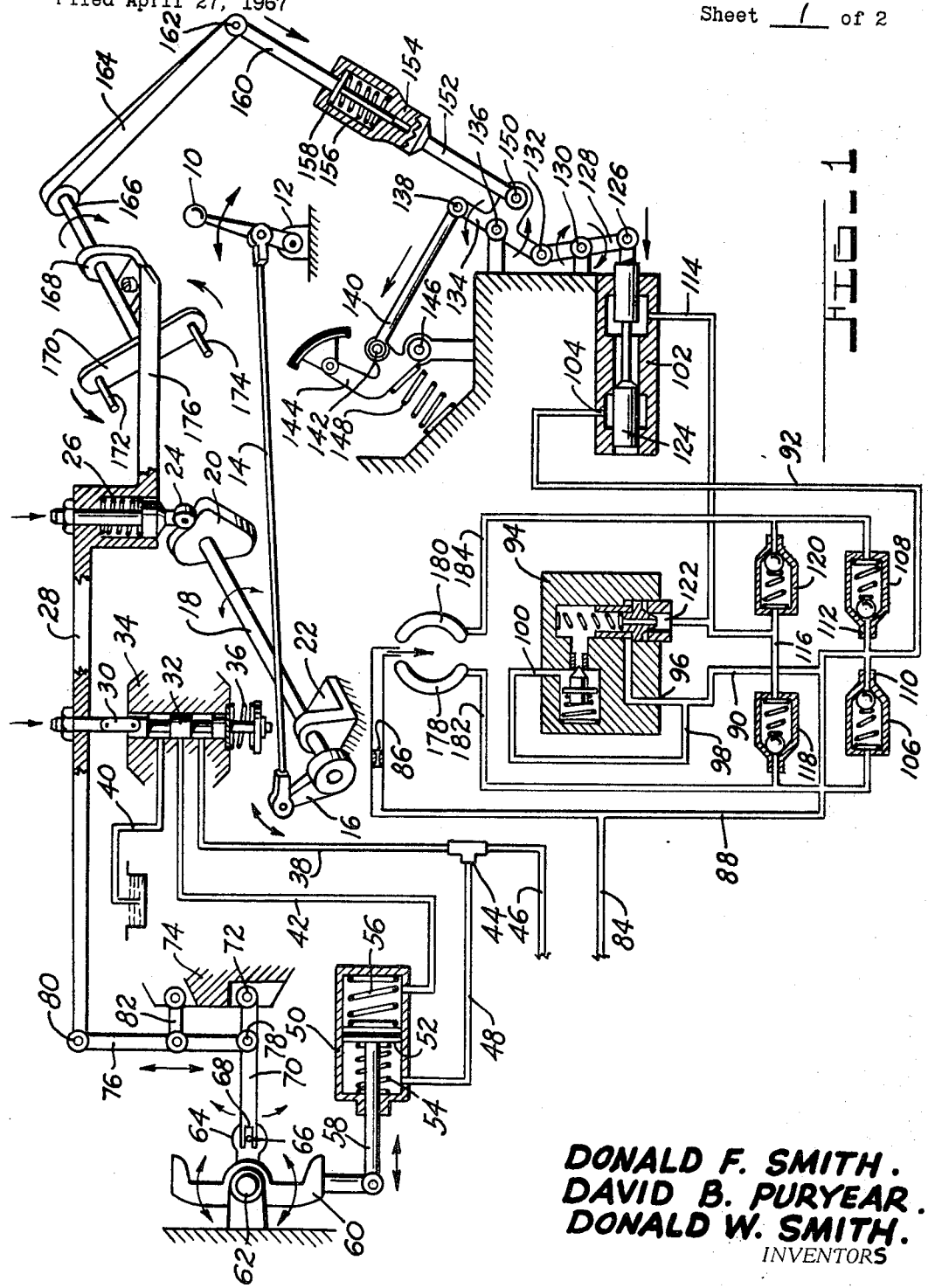

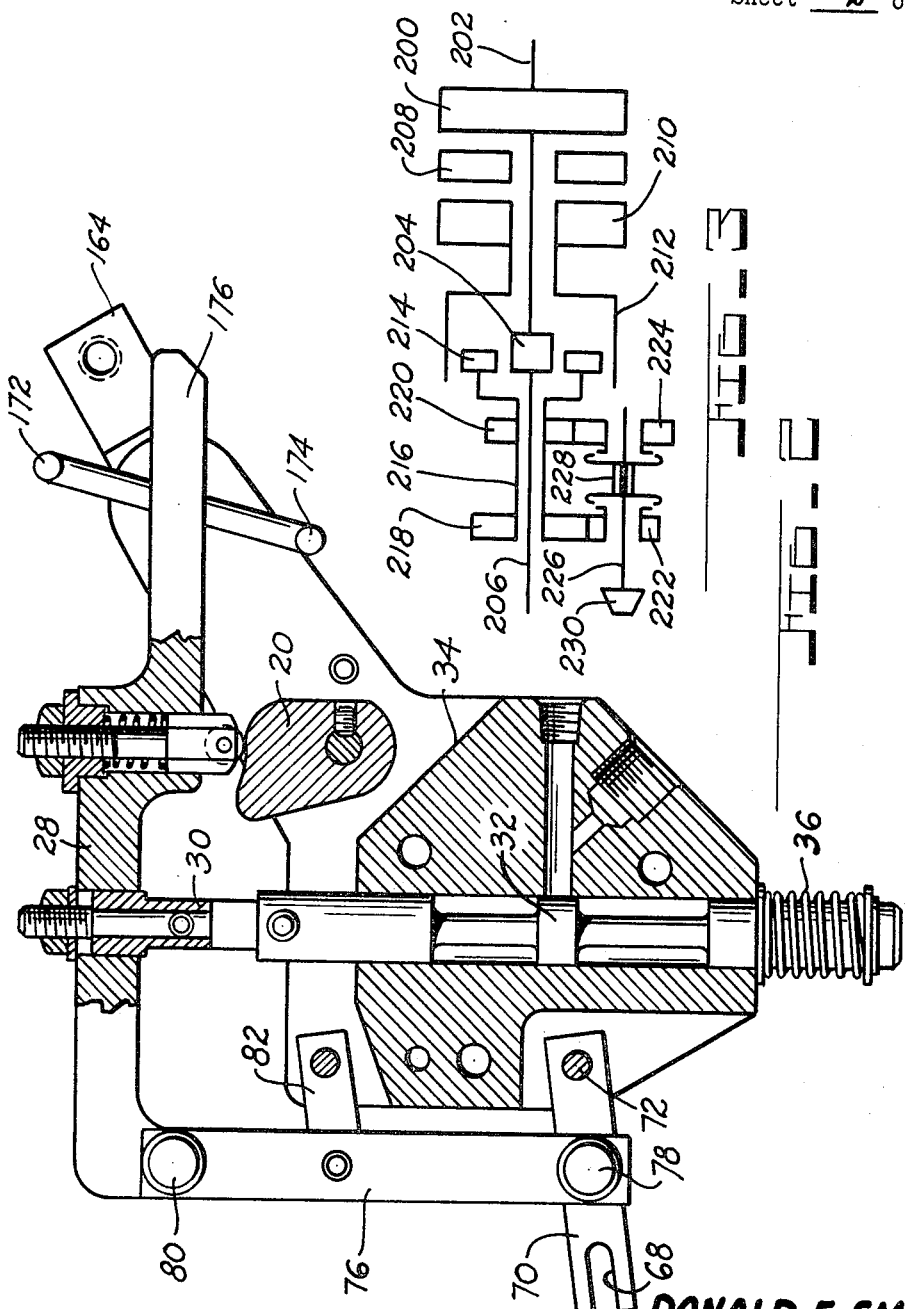

3,434,427
CONTROL MEANS FOR HYDROSTATIC TRANSMISSIONS
Donald F. Smith, Fort Wayne, Ind., and David B. Puryear and Donald W. Smith, St. Joseph, Mich., assignors to The Bendix Corporation, a corporation of Delaware
Filed Apr. 27, 1967, Ser. No. 634,243
Int. Cl. F04b 1/30; F16h 39/46
U.S. Cl. 103—38               8 Claims

ABSTRACT OF THE DISCLOSURE

A linkage control system for the operation of a valve controlling an actuator for a swash plate, or the like, of a fluid pump having in addition to feedback provisions a cam mechanism for controlling the setting of the valve via a beam with a yoke connection to the beam to override the cam upon actuation and permit reestablishment of the previous control settings upon release of the yoke connection.

SUMMARY

Prior art devices have been concerned with means for controlling split path hydrostatic transmissions which would cause the output shaft to stand still although the input shaft is rotating. Such prior art devices have provided a special mechanical brake or disconnecting device for this purpose which will be activated when the control lever is moved to the zero position to cause the output shaft to be disconnected or held fast by the mechanical braking. Because of the obvious problems that this creates, namely the combination with this brake of some means for disconnecting the control of the transmission, other prior art attempts have been suggested which have combined rate control means with position control devices so that the position control is effected in a limited range near the zero adjustment.

It is thus rather obvious that these prior art controls necessitated the changing of the transmission control whenever it was desired to stop the vehicle. The present invention, however, differentiates from the prior art control devices in the suggestion of an override means to effectively terminate the output of a hydrostatic transmission while maintaining a pressure differential between the inlet and discharge ports of the pump controlling the transmission. Furthermore, the invention also has the attendant advantage of permitting the hydrostatic transmission control lever to remain in its position when the operator is desiring to momentarily stop the vehicle by the use of a pedal so that upon release of the pedal the vehicle may again automatically return to its operating condition.

DRAWING DESCRIPTION

FIGURE 1 is a schematic illustration of a control system for a hydrostatic transmission incorporating the principles of this invention;

FIGURE 2 is a cross sectional view of a control device in accordance with the principles of this invention; and FIGURE 3 is a schematic illustration of a hydrostatic transmission such as may be utilized with the control device in accordance with the principles of this invention.

DETAILED DESCRIPTION

With reference now to FIGURE 1, there is shown a hand lever 10 pivotally mounted to fixed structure 12 of the vehicle for controlling a push rod 14 that is connected to a crank 16. The crank 16 is affixed to a shaft 18 for the control of a cam 20. As seen, the shaft 18 is journaled by pitmans 22 to the vehicle structure.

A cam follower 24 is biased by a spring 26 from a cavity within a beam 28 against an adjustable stop. Beam 28 is connected by means of a link 30 to a control valve 32 within housing 34 affixed to the vehicle. The control valve 32 is biased downward by a spring 36 but the force of spring 26 against the adjustable stop is greater than the force of spring 36 transmitted by valve 32 and beam 28 to the cam 20. When control valve 32 is in null position, it blocks the communication of conduits 38 and 40 with the conduit 42. Conduit 38 is connected to a T-fitting 44 which is communicated to a 250 p.s.i. pressure supply source by means of a conduit 46, and a conduit 48 communicated with the rod end of a cylinder 50 containing a piston 52 biased between springs 54 and 56. As seen, the base end of the actuator comprised of the cylinder 50 and piston 52 is communicated with the conduit 42. This actuator is constructed so that the force of the spring 54 with the 250 p.s.i. inlet pressure on the adjacent face of the piston 52 balances the force of the spring 56 and the pressure in conduit 42 or the larger base end piston area whenever the valve 32 is in the position shown. The piston 52 is connected by means of rod 58 to a swash plate 60 mounted on trunnion bearings 62 within a pump housing to control the travel of pump pistons (not shown) revolving on the face of the swash plate 60.

The swash plate 60 is also provided with a projection 64 having a pin 66 fitting within a slot 68 of a link 70 pivotally fixed as at 72 to fixed structure 74. The link 70 is pivotally joined to a link 76 as at 78 that is pivotally connected as at 80 to the beam 28. In order to restrain arcuate motion of the link 76 about pivot 78, a link 82 is pivotally connected between the link 76 and the housing 74 so that the link 76 can move only in response to a motion of link 70 whereby the beam 28 will follow up the positioning of the swash plate 60.

Thus, upon the movement of the lever 10 in the rearward direction or to the right as viewed in the drawing, the crank 16 and shaft 18 will rotate clockwise and thereby rotate the cam 20 clockwise whereby the cam follower moves the beam 28 to position the valve 32 to open, in opposition to the spring 36, the conduit 38 to the conduit 42 whereby the piston 52 will pivot the swash plate 60 in a clockwise direction about the trunnion mountings 62 thereof since equal pressure in rod and base ends will cause the cylinder to extend with a force equal to the rod 58 area times the pressure. It likewise would follow that counterclockise motion on the lever 10 to the left, as viewed in the drawing, would create an opposite control for the swash plate 60 by porting the base end pressure within the conduit 42 to the reservoir 40. As the swash plate travels about the trunnion 62 the beam 28 is following up this motion to restore the valve 32 to the lapped condition whenever the amount of control set by motion of the input lever 10 has been imparted to the swash plate 60.

A second fluid pressure source of between 100 and 200 p.s.i. is provided to a conduit 84 that is communicated to the housing of the pump via a restricted orifice 86 to provide a coolant flow within the pump housing. Also a branch conduit 88 is connected to this source of pressure supply which leads to branch conduits 90 and 92. Conduit 90 connects with a valve housing 94 as at 96 and to another branch conduit 98 which is also connected to the valve housing 94 as at 100. Conduit 92 connects to a spool valve housing 102 as at 104, and also to a pair of low pressure check valves 106 and 108 as at 110 and 112, respectively. The spool valve housing 102 is also communicated by means of a conduit 114 to a conduit 116 opening into a pair of high pressure check valves 118 and 120 and to an inlet 122 of the valve housing 94.

Within the spool valve housing 102 a valve spool 124 is operatively arranged which is connected, as at 126 to a link 128 pivoted, as at 130 to fixed structure of the vehicle. The other end of the link 128 is pivoted as at 132 to a crank 134 that is also pivoted as at 136 to the fixed structure. The crank 134 is connected by means of a pin 138 to a rod 140 connected, as at 142 to a pedal 144 pivoted as at 146 to the fixed structure. A spring 148 is operatively arranged between the fixed structure and the pedal 144 to maintain its neutral, released position.

Crank 134 is also provided with a pin 150 to which a rod 152 of a housing 154 is connected. Within the housing 154 is a spring 156 which biases a flange 158 of a rod 160 to abut on the housing 154. The rod 160 is connected by means of a pin 162 to an arm 164 of a shaft 166 rotatably supported by means of appropriately located journal blocks 168 to the fixed structure vehicle. The shaft 166 is provided with a pinch bar or yoke assembly 170 having pins or rods 172 and 174 operatively associated with a projection 176 of the beam 28 to be above and below the projection 176.

It may thus be realized that upon a depression of the pedal 144, holding for a moment the description of the operation of the spool valve 124, that the resilient linkage connecting the pedal to the yoke 170 will cause it to rotate to pick up the projection 176 and position the beam 28 to a position causing the servo control to react to a neutral condition for the swash plate 60, as shown, regardless of the attitude of the lever 10. In case of lever 10 being positioned to the left, the cam follower 24 will be lifted from contact with the cam 20 and in the opposite case the spring 26 will be compressed by the abutment of the follower 24 against the cam 20.

With reference now to FIGURE 2, there is shown a means whereby this linkage system aforedescribed, is integrated into one structure, and, as can be seen by comparing FIGURES 1 and 2, like numerals reference like parts.

With reference again now to FIGURE 1, the pump is shown to have kidney ports 178 and 180 connected by the respective conduits 182 and 184 to the high and low pressure valves 106, 108, 118 and 120, respectively. This connection is such that regardless which one of the ports 178 or 180 is pumping pressurized fluid, in contrast to the other port being an intake port, the valve 94 will function as a relief valve for the system to limit the pressure being supplied from the pump.

As valves 106, 108 and 118, 120 are set for different pressures, they will maintain the desired pressure differential to hydraulically spin motor 210 when spool valve 102 is open. Thus, as sun gear 204 is always driven, the motor 210 will be oppositely rotated to provide a zero speed at the gears 218 and 220. This will limit the torque output of gears 218 and 220 to a valve corresponding to a setting of valves 106, 108 and 118, 120.

With regard now to FIGURE 3, the hydrostatic transmission is schematically shown to include a pump rotor 200 that is driven by the shaft 202 which also passes through the hydrostatic transmission assembly to drive a sun gear 204 and provide a power take-off shaft 206. Depending upon the attitude of the swash plate 60, the pump rotor 200 discharges fluid to the valve plate 208 containing the kidney ports 178 and 180 to a fluid motor 210. The fluid motor 210 is revolved by the fluid discharged via the valve plate 208 to rotate the ring gear 212 to thereby drive planetary gears 214. As seen, the planetary gears are connected to a shaft 216 on which is placed a low gear 218 and a high gear 220 that are constantly meshed with gears 222 and 224. The drive shaft 226 is shiftable by means of coupling 228 between the gears 222 and 224 to provide a high and low speed drive for the gear 230.

OPERATION

As has been briefly explained above with regard to the operation of the cam 20, the hand lever 10 normally controls the attitude of the swash plate 60 and thus the discharge from the pump rotor 200 controlling the rotation of the motor 210. Other levers may be provided, as will be realized by those skilled in the art to which this invention relates, to control the attitude of the shifting coupler 228 to provide either high or low drive operation in forward or reverse depending upon the attitude of the lever 10.

When, however, it is desired to momentarily stop while going forward or backward, the operator of the vehicle may only depress the pedal 144 to operate the spool valve 124 and rotate the yoke 170.

Upon the actuation of the spool valve 124 the fluid being discharged from either port 178 or 180 will be bypassed to the other or inlet port. The length of the links 128 and 134 as well as the point of the pin 150 connecting the resilient link to the links is preferably chosen so that there will be a great deal of overtravel in the operation of the spool valve 124. As the yoke or pinch bar 170 is rotated by the resilient linkage from the clutch pedal 144, the beam 28 will be raised or lowered with respect to the cam 20 to position the swash plate 60 in the neutral condition, as shown.

When it is desired to return to the driving attitude for the hydrostatic transmission, the pedal 144 is released, and, because of the overtravel of the valve 124, the beam 28 will be permitted to reset, automatically, to the prior attitude of the swash plate 60 before the bypassing of the fluid from either the port 178 or 180 of the valve plate 208 is terminated. This will insure that upon desiring to return to the drive condition that one does not experience an opposite direction of travel before returning to the desired direction of travel.

Having fully described an operative construction of our invention, it is now desired to set forth the intended coverage sought by these Letters Patents in the following claims.

We claim:
1. A control mechanism for a means having a controllable member, said mechanism comprising:
   An actuator operatively connected to said member;
   a valve operatively connected to said actuator, said valve being biased in one direction;
   a beam operatively connected to said member and said valve;
   a follower means operatively connected to said beam;
   a movable surface operatively arranged to control said follower means to position said beam and thereby operate said valve; and
   lever means operatively connected to said beam to override said surface in operating said controllable member, said lever means including a yoke operatively connected to said beam, a link means operatively connected to said yoke and a pedal operatively connected to said link means, said link means having a resilient portion to prevent loads on said pedal from being imparted to said yoke.
2. A control mechanism according to claim 1 and further comprising a spool valve controlling pressure discharge flow of said means; and
   means to link said spool valve to said pedal such that on release of said pedal said yoke releases said beam prior to return of said valve to its rest position.
3. A control mechanism for a variable discharge fluid pressure device, said control mechanism comprising:
   an actuator means including a double acting fluid cylinder;
   a first valve operatively connected to said fluid cylinder;
   a second valve operatively connected to said device to control bypassing of fluid pressure being discharged therefrom;
   a beam operatively connected to said actuator means and said first valve;
   a cam follower operatively connected to said beam, said cam follower having a spring biased roller movable relative to said beam;

a cam for controlling said cam follower and thereby positioning said beam to operate said first valve, said cam being operatively connected to a first manually controlled means;

a yoke operatively associated with said beam and arranged to operate said beam to override the cam's operation thereof; and a second manually controlled means operatively connected to said yoke and said second valve.

4. A control mechanism according to claim 3 wherein said second manually controlled means includes link connections between said yoke and said second valve which permit overtravel in actuation of said valve as said yoke is overriding the cam operation of said beam so that on release of said second manually controllable means said actuator automatically returns said member to the position desired by said first manually controlled means prior to complete return of said second valve terminating the bypassing of fluid pressure from said device.

5. A control mechanism according to claim 4 wherein said link connections include a resilient link between said yoke and said second manually controlled means.

6. A control mechanism according to claim 2 and further comprising check valve means operatively connected to said spool valve to overcome errors in positioning of said controllable member.

7. A control mechanism according to claim 3 and further comprising check valve means operatively connected to said second valve to control pressure differential between inlet and outlet ports of said fluid pressure device.

8. A control mechanism according to claim 1 wherein said controllable device is characterized as a pump having inlet and outlet ports and further comprising a set of low and high pressure checks operatively connected to each of said inlet and outlet ports and a valve which is operatively connected to said lever means for bypassing fluid of said pump whenever said lever means causes said beam to override said surface controlling discharge of said pump.

References Cited

UNITED STATES PATENTS

| | | | |
|---|---|---|---|
| 1,947,540 | 2/1934 | Wallace | 103—38 |
| 2,661,701 | 12/1953 | Ferris | 103—162 |
| 2,945,449 | 7/1960 | Le Febvre et al. | 103—162 |
| 3,049,884 | 8/1962 | Schroeder | 103—38 X |
| 3,163,115 | 12/1964 | Neff et al. | 103—38 |
| 3,186,310 | 1/1965 | Neff et al. | 103—38 X |
| 3,354,981 | 11/1967 | Swanson et al. | 60—52 X |

WILLIAM L. FREEH, *Primary Examiner.*

U.S. Cl. X.R.

91—199, 415, 466; 103—162